Oct. 21, 1930.  H. SOUPLIS  1,779,052
ELECTRIC AMUSEMENT DEVICE
Filed July 25, 1929  4 Sheets-Sheet 1
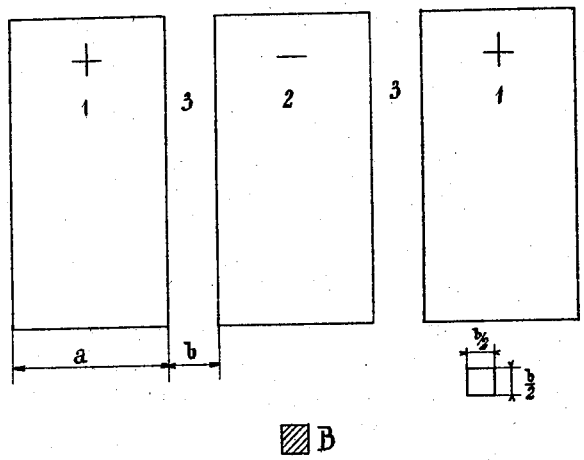
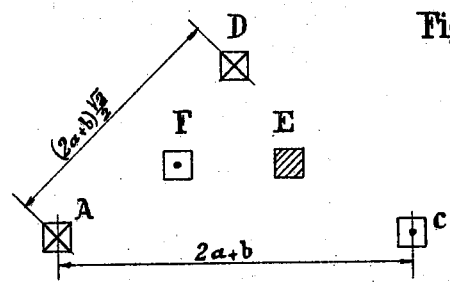
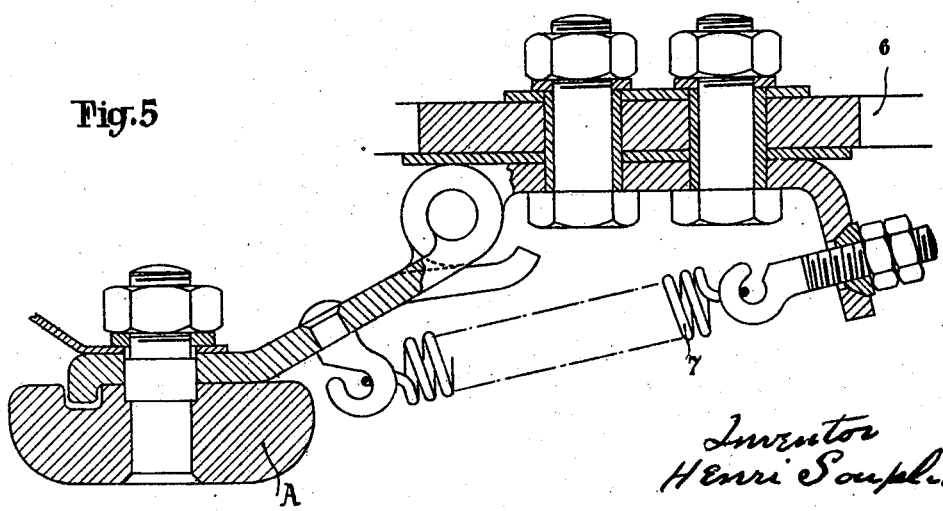
Inventor
Henri Souplis
By Edward C. Sarnett Oct. 21, 1930.  H. SOUPLIS  1,779,052
ELECTRIC AMUSEMENT DEVICE
Filed July 25, 1929   4 Sheets-Sheet 3

Oct. 21, 1930.   H. SOUPLIS   1,779,052
ELECTRIC AMUSEMENT DEVICE
Filed July 25, 1929   4 Sheets-Sheet 4
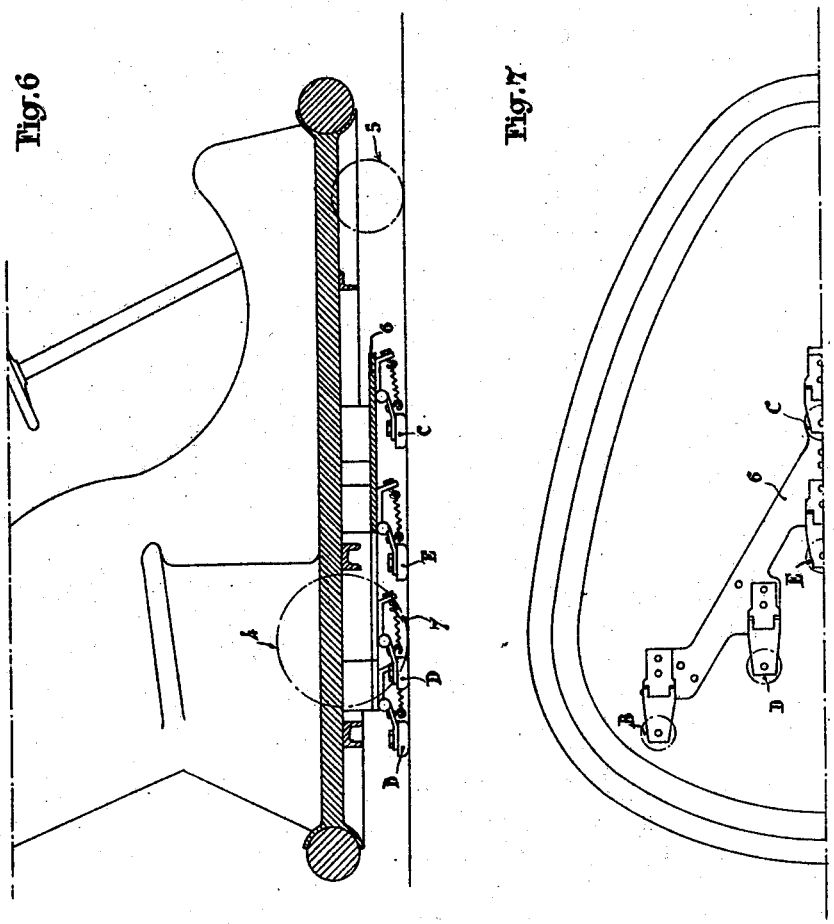
Inventor
HEnri Souplis
By Edward C. Sasnett
Atty.

Patented Oct. 21, 1930

1,779,052

UNITED STATES PATENT OFFICE

HENRI SOUPLIS, OF PARIS, FRANCE

ELECTRIC AMUSEMENT DEVICE

Application filed July 25, 1929, Serial No. 380,903, and in France August 1, 1928.

This invention relates to electric connections for trailers of amusement devices capable of being moved by electric power and this in all directions upon a race constituted by parallel conductive strips separated the one from the other by means of insulating parallel strips, two successive conductive strips being respectively connected to the two poles of a source of electric power. The connections between the trailers and the conductive strips are made by rubbers mounted under the trailers and sliding whilst remaining in contact with the conductive strips so as to feed an electric circuit with which every one of the trailers is provided and including a motor operating the latter. This device does away with every current supply disposed above the trailers and thus avoids the use of a trolley the presence of which constituted a hindrance as regards the height and the shape given to the roof of the amusement device.

The systems of this kind as used at present are provided with four rubbers mounted under the trailers according to a line at right angle with the longitudinal axis of the trailers, these devices systems showing however the following disadvantages:

1—In case the feeding of the trailer motor is controlled by an automatic reverser, automaticity is obtained but for two rubbers, the two other rubbers being controlled by return spring; it results therefrom that as the operation of these springs becomes defective after a somewhat short period of time, irregularities occur in the running of trailers as well as short-circuits capable of causing accidents.

2—In case each trailer is equipped with two independent motors, each of which is branched upon two rubbers, the automatic reverser is done away with, but if the four rubbers are simultaneously in contact with the conductive strips, both motors will be started simultaneously, the consumption of power is exaggerated and as practically the two motors are never revolving at the same rate, mechanical troubles occur in the non-synchronous transmissions of the revolutions to the same wheel, the vehicles being then rapidly put out of use.

3—If the electric circuits only comprise but one single motor controlled by a system of solenoids, switches, relays operating so that the motor will only be fed by a single circuit at one time, this system entirely does away with the inconveniences described with reference to the two preceding systems, but is not satisfactory except when the trailers are moving in parallelism with the conductive strips or according to an angle not exceeding 45° relatively to the longitudinal axis of the strips. If for any reason, the trailers depart from this limiting angle, the motor is no longer fed with current, the trailers stop and have to wait until, in virtue of the impact produced by a trailer arriving after them, they are returned, as regards direction, into the limiting zone so as to be able to be started again, this impact determining the destruction of the stock.

All the above mentioned inconveniences are avoided by the judicious arrangement of six rubbers connected two by two, by means of solenoids, switches, and relays, with a single motor. The way of carrying out the invention is shown by way of example in the accompanying drawings in which:

Fig. 1 shows the arrangement of the rubbers under a trailer.

Fig. 2 is a view of a part of the race of the amusement device.

Fig. 5 shows on a larger scale the arrangement of a rubber under a trailer.

Figs. 6 and 7 are respectively an elevation with partial sectional view and a lower plane of a trailer of the device.

The latter comprises a race constituted by parallel conductive strips 1 and 2 the width of which is indicated in $a$ and which are separated by parallel insulating strips 3 the width of which is $b$. All the strips 1 are connected to the positive pole of an electric power supply and the strips 2 to the negative pole. Under the trailers, six rubbers A, B, C, D, E and F are mounted sliding whilst being maintained in contact with the strips 1, and 2 and forming part, two by two (A and D, B and E, C and F) of a same electric circuit comprising a motor M which can be supplied by any one of the three circuits.

Practice has shown that, whatever may be the direction of the trailers relatively to the conductive strips at least two of the coupled rubbers were always respectively in contact with two successive strips of different polarities when, as indicated in Fig. 1, the rubbers constituted the apexes of an equilateral triangle having for size of side $(2a+b)$ and when the corresponding rubbers D, E, F constituted the apexes of a second equilateral triangle inside the above triangle and geometrically realized taking into account that the distance of the corresponding rubbers AD, BE and CF are equal to $$(2a+b)\frac{\sqrt{2}}{2},$$

that is to say to the length of the side of a square having for diagonal the length $(2a+b)$, the contact surface of each rubber being represented by a square the side of which is $\frac{b}{2}$.

Figure 3:
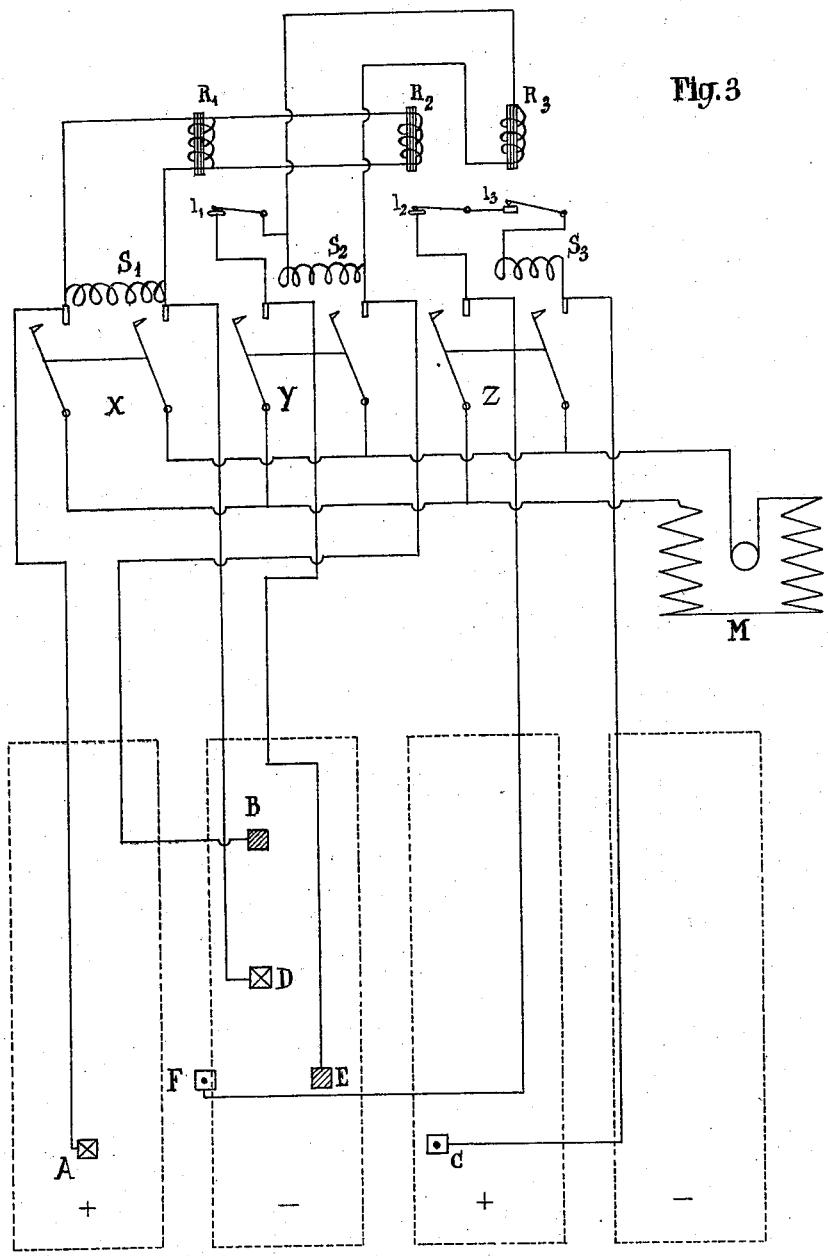
Fig. 3 is a diagram showing the way in which are coupled the connections of a circuit including a series motor.

The corresponding rubbers AD, BE and CF form part of three electric circuits comprising each a solenoid $S_1$, $S_2$ or $S_3$ respectively determining the closing and opening of corresponding switches X, Y, Z of the same kind as these which are used for the equipment of lifts and each controlled by an electromagnetic device, not shown. Each of the three switches is connected to the terminals of the motor M (see Fig. 3).

Finally, the first circuit still comprises two relays $R_1$ and $R_2$ able of determining, at the moment they are excited, the opening of two switches $I_1$ and $I_2$ normally closed and mounted respectively in the second and third circuits. The second circuit also comprises a relay $R_3$ which determines, when excited, the opening of the switch $I_3$, normally closed and mounted in the third circuit.

When the rubbers A and D are respectively on two strips 1 and 2 of a different polarity, the solenoid $S_1$ is excited, closes the switch X and the motor M is started. The relays $R_1$ and $R_2$ being simultaneously excited, the switches $I_1$ and $I_2$ are opened, thereby maintaining the two other circuits opened, even when the rubbers B and E or C and F were in contact with the strips 1 and 2.

The feeding of the motor M is therefore always secured by a single circuit. It will be easily observed that if the second circuit would have been closed, the relay $R_3$ would maintain the third circuit opened.

Figure 4:
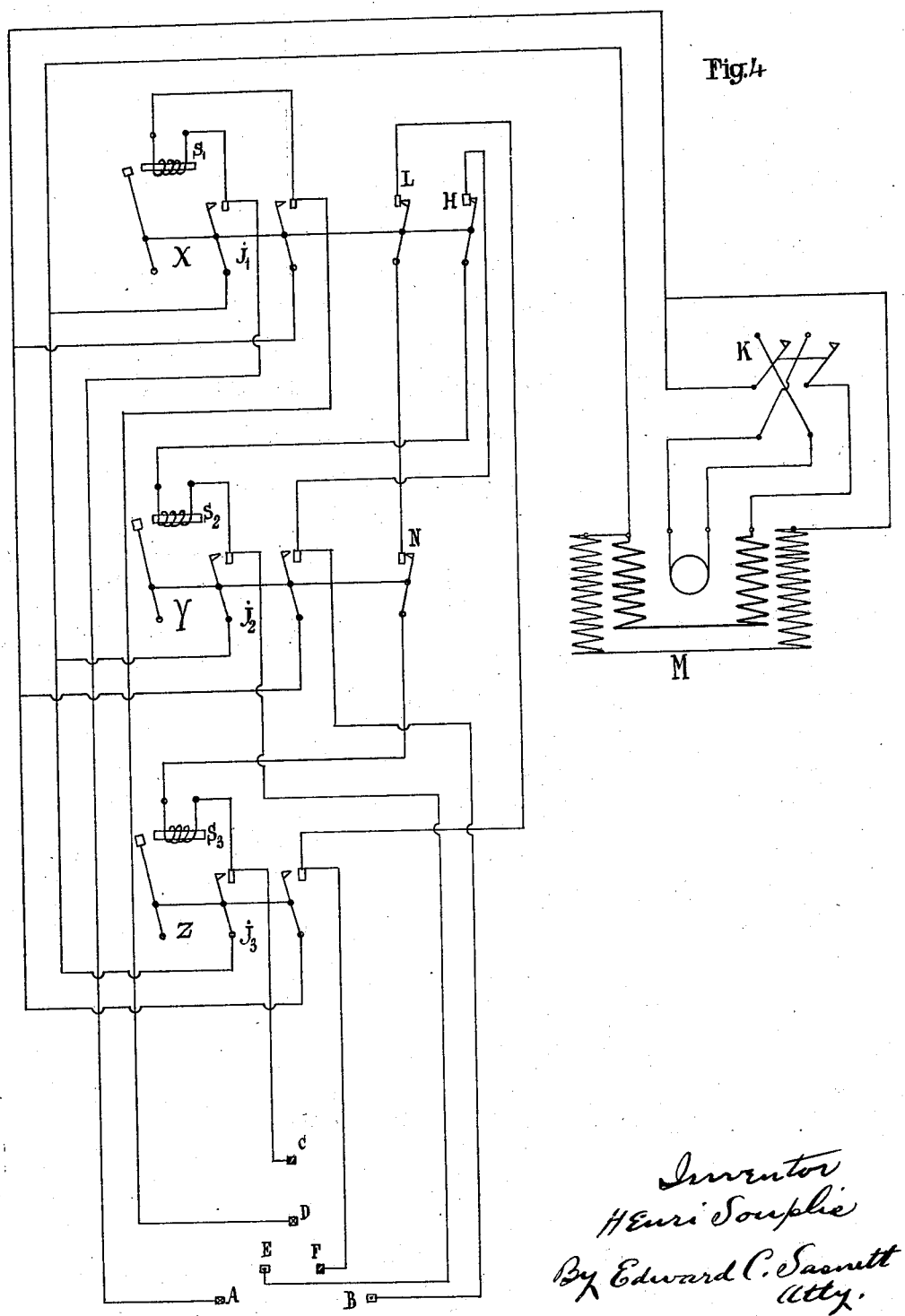
Fig. 4 is a diagram of coupling with compound motor.

Fig. 4 shows a diagram of connection comprising a compound motor and allowing the trailers, through the medium of a two-pole reverser with dead point K branched upon the circuit of the armature, to realize the fore or back motion or to revolve about itself. The electric circuits comprise as in the previous case, three switches X, Y and Z, three solenoids $S_1$, $S_2$ and $S_3$ and three subsidiary two-pole switches $J_1$, $J_2$ and $J_3$, directly controlled by the main switches X, Y and Z without the medium of relays; there is moreover a cut-out switch H connected in the second circuit but operated by the switch X and two cut-out switches L and N mounted in the third circuit, but operated respectively by the switches X and Y.

Figs. 5, 6 and 7 are detail views of a rubber and of the arrangement of the rubbers under the trailers which are provided with rear wheels 4 the one of which at least is a driving wheel and a front wheel 5 which is a steering one.

Finally, each rubber is pivoted on a triangular frame 6 and is under the action of return springs 7 which cause the rubbers to remain in contact with the race in spite of the obstacles which the trailers may meet.

What I claim is:

1. Electric amusement device comprising, in combination with a race formed of parallel conductive strips separated by insulating strips and having successively different polarities, trailers under which six rubbers are mounted forming respectively the apexes of two homothetic equilateral triangles, the length of one side of the external triangle being equal to twice the width of a conductive strip having added thereto the width of an insulating strip and the distance between one apex of this triangle and one of the opposed apexes of the internal triangle being equal to the length of the side of a square having for its diagonal the length of one side of the external triangle.

2. Electric amusement device comprising, in combination with a race formed of parallel conductive strips separated by insulating strips and having successively different polarities, trailers under which six rubbers are mounted forming respectively the apexes of two homothetic equilateral triangles, three electric circuits connected to the poles of the motor and comprising each a rubber for each one of the triangles, a solenoid and a switch controlled by this solenoid.

3. Electric amusement device comprising, in combination with a race formed of parallel conductive strips separated by insulating strips and having successively different polarities, trailers under which six rubbers are mounted forming respectively the apexes of two homothetic equilateral triangles, a motor, three electric circuits connected to the poles of the motor and each comprising two rubbers, a solenoid and a main switch controlled by this solenoid, two relays mounted in the first circuit and a relay mounted in the second circuit.

In testimony whereof I hereunto affix my signature.

HENRI SOUPLIS.